H. W. WATSON.
Coffee-Pot.
No. 163,286.
Patented May 11, 1875.
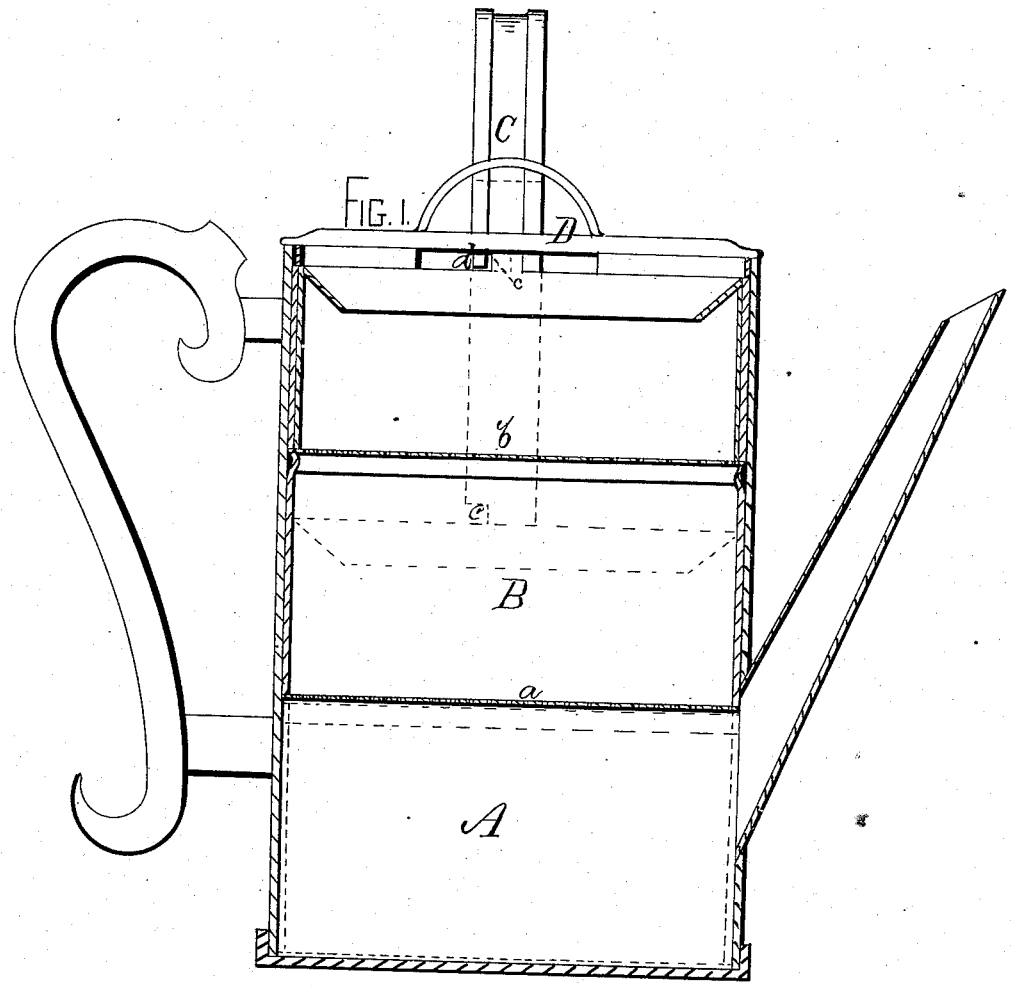
WITNESSES
INVENTOR

UNITED STATES PATENT OFFICE.

HENRY W. WATSON, OF NEW YORK, N. Y.

IMPROVEMENT IN COFFEE-POTS.

Specification forming part of Letters Patent No. 163,286, dated May 11, 1875; application filed January 27, 1875.

*To all whom it may concern:*

Be it known that I, HENRY W. WATSON, of the city, county, and State of New York, have invented a new and useful Improvement in Coffee-Pots; and I do hereby declare that the following is a full and exact description thereof, reference being had to the accompanying drawing making part of this specification, and representing a central vertical section of a coffee-pot provided with my improvement.

The nature of my invention consists in the combination, with a coffee-pot, of an adjustable coffee-holder of peculiar construction, to contain the ground coffee, and arranged to hold the coffee submerged in the water as long as required for steeping, and then be raised to a position above the water, and be retained there for dripping, and retaining the aroma of the coffee in the coffee-pot while pouring out the coffee, substantially as herein specified.

In the drawing, A represents a coffee-pot of ordinary construction, to which my adjustable coffee-holder B is applied. This holder is a cup or vessel of sufficient size to contain as much ground coffee as may be required to make the quantity of steeped coffee which the coffee-pot A, to which it is applied, will contain. It may nearly fill the interior diameter of the coffee-pot, or less. It has a perforated or gauze bottom, $a$, to allow the water to percolate through, and it may have a top or cover, $b$, also perforated or reticulated, and cup-shaped or hollow on top, for convenience of pouring water into the holder. This top, however, is not essential, and may be dispensed with. It has a handle, C, extending from one side upward, so as to reach up out of the coffee-pot when the coffee-holder is in its lowest position in the coffee-pot. This handle has a notch or catch, $c$, of any convenient construction, to catch upon a projection, $d$, on the inside of the coffee-pot, and thereby hold the coffee-holder at the desired height in the coffee-pot. There may be two or more such catches, if desired, or the device be so constructed as to hold the coffee-holder at different heights. A notch in the edge of the cover D of the coffee-pot, or depression in the side of the coffee-pot, serves for the handle of the coffee-holder to run in, without opening or interfering with the opening and closing of the said cover or lid.

Constructed and arranged as above, the coffee-holder B is filled or provided with the required amount of ground coffee, and is then either dipped into and submerged in the water previously poured into the coffee-pot, or it is inserted first into the coffee-pot, and then the water is poured in through the holder, thereby at once extracting much of the aroma and extract of the coffee. (The submerged position of the coffee-holder is shown by dotted lines in the drawings.) Then, as soon as the coffee has steeped sufficiently in the water, the coffee-holder is raised into the position indicated by full lines, or above the liquid in the coffee-pot, by simply drawing upon the handle C, and engaging the catch. Thus no aroma is allowed to escape, the coffee-pot lid remaining closed, and the water can drain from the dregs, the holder remaining in the coffee-pot, if desired, while pouring out the coffee, which never becomes bitter or muddy by the retention of the dregs therein.

What I claim as my invention, and desire to secure by Letters Patent, is—

The coffee-holder B, constructed with the projecting handle C and notch $c$, in combination with the coffee-pot A, having the inward projection $d$ and notch or depression outside of its cover D, as and for the purpose herein specified.

HENRY W. WATSON.

Witnesses:
J. S. BROWN,
JOHN THOMPSON.